(12) United States Patent
Wada et al.

(10) Patent No.: US 6,977,678 B1
(45) Date of Patent: Dec. 20, 2005

(54) MONITOR CAMERA SYSTEM AND METHOD OF CONTROLLING MONITOR CAMERA THEREOF

(75) Inventors: Jyoji Wada, Yokohama (JP); Katsumi Yano, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 976 days.

(21) Appl. No.: 09/649,175

(22) Filed: Aug. 29, 2000

(30) Foreign Application Priority Data

Aug. 31, 1999 (JP) ................................ 11-246199

(51) Int. Cl.$^7$ ............................................. H04N 5/232
(52) U.S. Cl. .............................. 348/211.99; 348/211.5; 348/143
(58) Field of Search ....................... 348/211, 99, 211.3, 348/211.4, 211.5, 211.6, 211.7, 211.8, 211.11, 348/211.12, 211.13, 143, 211.99, 3, 152

(56) References Cited

U.S. PATENT DOCUMENTS

| | | | | |
|---|---|---|---|---|
| 5,111,288 A | * | 5/1992 | Blackshear | 348/143 |
| 5,164,827 A | * | 11/1992 | Paff | 348/143 |
| 5,517,236 A | * | 5/1996 | Sergeant et al. | 348/143 |
| 5,526,041 A | * | 6/1996 | Glatt | 348/143 |
| 5,568,183 A | * | 10/1996 | Cortjens et al. | 348/211.3 |
| 5,808,670 A | * | 9/1998 | Oyashiki et al. | 348/143 |
| 5,872,594 A | * | 2/1999 | Thompson | 348/211.6 |
| 6,359,647 B1 | * | 3/2002 | Sengupta et al. | 348/143 |
| 6,392,693 B1 | * | 5/2002 | Wakiyama et al. | 348/143 |
| 6,665,006 B1 | * | 12/2003 | Taguchi | 348/211.8 |
| 6,714,236 B1 | * | 3/2004 | Wada et al. | 348/152 |
| 6,744,461 B1 | * | 6/2004 | Wada et al. | 348/143 |
| 6,867,798 B1 | * | 3/2005 | Wada et al. | 348/143 |
| 2004/0075739 A1 | * | 4/2004 | Wada | 348/143 |
| 2004/0114037 A1 | * | 6/2004 | Kawazoe et al. | 348/143 |

FOREIGN PATENT DOCUMENTS

JP        6-153048        5/1994

\* cited by examiner

*Primary Examiner*—Aung Moe
(74) *Attorney, Agent, or Firm*—McDermott Will & Emery LLP

(57) ABSTRACT

In a monitor camera system includes a monitor camera capable of rotation 360 degrees in pan directions and 180 degrees in tilt directions and a control unit for controlling the monitor camera remotely, the control unit sends control data indicative of a photographing position or photographing direction of the monitor camera to said monitor camera, while the monitor camera receives the control data to calculate, on the basis of the control data, a pan rotation quantity and a tilt rotation quantity by which the monitor camera is to be rotated from the present camera position, thus accomplishing its pan rotation or tilt rotation according to the calculated rotation quantity. Accordingly, with this configuration, an operator can align the monitor camera in a target direction by merely manipulating a joystick in the target direction, that is, can face the monitor camera to a target position through a simple manipulation. Additionally, this configuration makes it unnecessary for the operator to understand the present camera direction.

1 Claim, 11 Drawing Sheets

PRESET POINT

| ID | PAN | TILT | ZOOM | FOCUS |
|----|-----|------|------|-------|
| 1  | P1  | T1   | Z1   | F1    |
| 2  | P2  | T2   | Z2   | F2    |
| 3  | P3  | T3   | Z3   | F3    |
| :  | :   | :    | :    | :     |

|             | PAN ROTATION ANGLE | TILT ROTATION ANGLE |
|-------------|---------------------|---------------------|
| FIRST PATH  | P2−Pt               | \|T2\|−\|Tt\|       |
| SECOND PATH | 360−P2−Pt           | \|T2\|−\|Tt\|       |
| THIRD PATH  | P2−(Pt+180)         | \|T2\|+\|Tt\|       |
| FOURTH PATH | 180−P2−Pt           | \|T2\|+\|Tt\|       |

MONITOR CAMERA SYSTEM AND METHOD OF CONTROLLING MONITOR CAMERA THEREOF

BACKGROUND OF THE INVENTION

1. Field of the Invention

The present invention relates to a monitor (surveillance) camera system comprising a monitor camera and a method of controlling a photographing direction of the monitor camera, and more particularly to a monitor camera system and photographing direction controlling method, which are capable of easily facing the monitor camera toward a desired direction through remote manipulation or control.

2. Description of the Related Art

So far, a monitor camera in which a camera and a rotatable table therefor are placed in a dome-like housing has been put on the market. This monitor camera is called a "compound camera" because of the camera being capable of, through movements of the rotatable tables, rotating horizontally (pan) while rotating vertically (tilt). The compound camera can rotate through 360 degrees without limitation in the pan directions, while rotating in an angular range between 0 degrees and 90 degrees, that is, from a horizontal direction to a vertical direction, in the tilt directions. In addition, through the manipulation of a controller, this compound camera can take a photograph at a desired angle or in a desired direction in a state installed on a ceiling of public facilities or the like. Still additionally, even if a target subject passes right under it, as FIG. 14 shows, immediately a camera 10 turns to right under, it can rotate 180 degrees around a lens thereof to chase the target subject continuously, thus providing pictures throughout a monitoring area.

FIG. 12 is an illustration of a state in which a controller 12 for controlling a compound camera 11 and a monitor 13 for displaying a picture taken through the compound camera 11 are connected through a coaxial cable 16 to the compound camera 11. The controller 12 functions as a control element and comprises a joystick 14 and a numeric pad (numeric keys) 15.

This compound camera 11 is designed so that a plurality of camera positions, for example, taking a direction to an entrance, a direction to an exit and a direction to a window, are preset in the controller 12 in the form of identification numbers (ID). After preset, simply by inputting the ID corresponding to a camera position through the use of the numeric pad 15, the camera can be turned to follow the preset direction.

In addition, the joystick 14 of the controller 12 is manipulated for controlling the moving (rotating) speed of the camera 11. When the joystick 14 is tilted, as shown in FIG. 13, the camera 11 rotates in a tilting direction at a speed proportional to the movement component of the joystick 14 in the vertical-axis direction and rotates in a panning direction at a speed proportional to the movement component thereof in the horizontal-axis direction. An operator checks pictures while viewing the monitor 13 and, when the rotating camera 11 catches a desired direction, the operator returns the joystick 14 to the neutral position to stop the rotation thereof in the tilting and panning directions.

Meanwhile, a group including the inventors of the present invention has developed a new compound camera capable of limitlessly rotating 360 degrees in panning directions while rotating 180 degrees in tilting directions. This compound camera can provide the increased degree of freedom in moving direction and, hence, is capable of moving promptly to the target camera position through the shortest path. In addition, this compound camera can set the field angle in the zoom-up condition at approximately two degrees to allow an enlarged display of a local area.

However, when a camera has a high zooming ability, difficulty is encountered in understanding what place a picture displayed shows. Therefore, in a case in which there is a need to align the camera in a specific direction through the use of a joystick of a controller, difficulty is experienced in understanding the direction the camera is to be aligned in, that is, the joystick tilting direction, by viewing only a zoomed picture appearing on a monitor.

In this case, in general, the camera is released from its zooming condition to display a picture with a standard field angle on the monitor for confirming the present photographing direction from that picture, before the joystick is manipulated to implement the camera speed control. However, this procedure tends to take much time, and is undesirable, for example, in the case of facing the camera toward a place in which an abnormal situation has occurred.

SUMMARY OF THE INVENTION

Accordingly, the present invention has been developed with a view to eliminating these problems, and it is an object of the invention to provide a monitor camera system and camera controlling method which are capable of promptly aligning the camera with a target position through simple manipulation.

For this purpose, in accordance with an aspect of the present invention, there is provided a monitor camera system comprising a monitor camera having a rotating mechanism with at least one revolution axis and control means for controlling the monitor camera, the control means sending control data for designation of one of a photographing position and photographing direction of the monitor camera to the monitor camera, while the monitor camera receiving the control data and calculating one of a pan rotation quantity and a tilt rotation quantity, by which the monitor camera is to be rotated from the present camera position, on the basis of the received control data so that one of pan rotation and tilt rotation of the monitor camera is made according to the calculated quantity.

Furthermore, the monitor camera retains data representative of at least one of the present pan angle and present tilt angle of the monitor camera as a quantity of state of the present camera position, and obtains, on the basis of the control data, one of a pan angle and tilt angle to be made for when the monitor camera takes one of the designation photographing position and the designation photographing direction for calculating the pan rotation quantity or the tilt rotation quantity on the basis of a difference between the obtained pan or tilt angle and the present pan or tilt angle.

Still furthermore, the monitor camera calculates, as one of the pan rotation quantity and the tilt rotation quantity, one of a pan rotation quantity and a tilt rotation quantity, to be set for when the monitor camera moves through the shortest path to one of the camera photographing position and the camera photographing direction.

In this case, it is also appropriate that the monitor camera additionally retains data indicative of a zoom state of the monitor camera as the state quantity to adjust, on the basis of the zoom state data, a zoom quantity after the monitor camera is aligned with the designation photographing position and designation photographing direction, or that the monitor camera additionally retains, as the state quantity, data on color balance, image level and cyclic stop time.

In addition, it is also appropriate that the control means includes coordinate inputting means for designating one of a position and a direction on a monitoring area of the monitor camera, and sends, as the control data, data indicative of one of a position and direction, inputted through the coordinate inputting means, to the monitor camera. In this case, a joystick can be provided as the coordinate inputting means. This joystick can be used additionally as means for inputting data on moving speed control of the monitor camera, and a switch is provided for conducting the switching between the coordinate inputting mode and the moving speed control data inputting mode in the joystick.

In the case of the use of the coordinate inputting means, it is also appropriate that the data inputted through the coordinate inputting means is fed to the monitor camera through selective operation of a switch, or that a map showing a monitoring area of the monitor camera is placed around the coordinate inputting means.

Moreover, it is also possible that the control means includes a screen for displaying a monitoring area of the monitor camera, and data indicative of one of a position and a direction in the monitoring area, pointed out on the screen is fed as the control data to the monitor camera. The monitoring area can be displayed on the basis of data on a building design drawing, and a preset point can be displayed additionally in the monitoring area on the screen. In this case, when a distance between the position pointed out on the screen and a position of the preset point is below a predetermined value, data on designation of the preset point is fed as the control data to the monitor camera.

In addition, in accordance with another aspect of the present invention, there is provided a camera controlling method for use in a monitor camera system for controlling a monitor camera of the monitor camera system, the monitor camera having a rotating mechanism with at least one revolution axis, the method comprising a step of sending, as control data for the monitor camera, control data on designation of one of a camera photographing position and a camera photographing direction to the monitor camera, a step of calculating, on the basis of the control data, one of a pan rotation quantity and a tilt rotation quantity by which the monitor camera is to be rotated from the present camera position, in the monitor camera side, and a step of rotating the monitor camera in one of pan and tilt directions according to the calculated rotation quantity.

In this camera controlling method, the monitor camera side retains at least data indicative of one of the present pan angle and the present tilt angle as a quantity of state of the present camera position of the monitor camera, and calculates, on the basis of the control data, one of a pan angle and a tilt angle to be set for when the monitor camera takes the designated photographing position or the designated photographing direction to calculate one of the pan rotation quantity and the tilt rotation quantity as a function of a difference between the calculated pan angle or tilt angle and the present pan angle or tilt angle. In this case, it is also appropriate that one of the pan rotation quantity and the tilt rotation quantity to be calculated is one of a pan rotation quantity and a tilt rotation quantity to be set for when the monitor camera moves through the shortest path to one of the camera photographing position and the camera photographing direction. It is also possible that the state quantity further includes data indicative of a zoom state of the monitor camera to control a zoom quantity after the monitor camera is aligned with the designated photographing position and designated photographing direction.

Furthermore, it is also appropriate that one of a position and a direction on a monitoring area of the monitor camera is designated through coordinate inputting means, and data indicative of the position or the direction inputted from the coordinate inputting means is sent as the control data to the monitor camera, or that a monitoring area of the monitor camera is displayed on a screen, and data indicative of one of a position and a direction on the monitoring area pointed out on the screen is sent as the control data to the monitor camera. It is also possible that a preset point is further displayed on the screen so that the preset point is designated on the screen, or that a picture taken by the monitor camera is displayed on a screen, and data designating a position on the picture is sent as the control data to the monitor camera.

BRIEF DESCRIPTION OF THE DRAWINGS

Other objects and features of the present invention will become more readily apparent from the following detailed description of the preferred embodiments taken in conjunction with the accompanying drawings in which.

DETAILED DESCRIPTION OF THE INVENTION

Embodiments of the present invention will be described hereinbelow with reference to the drawings.

First Embodiment

Figure 9:
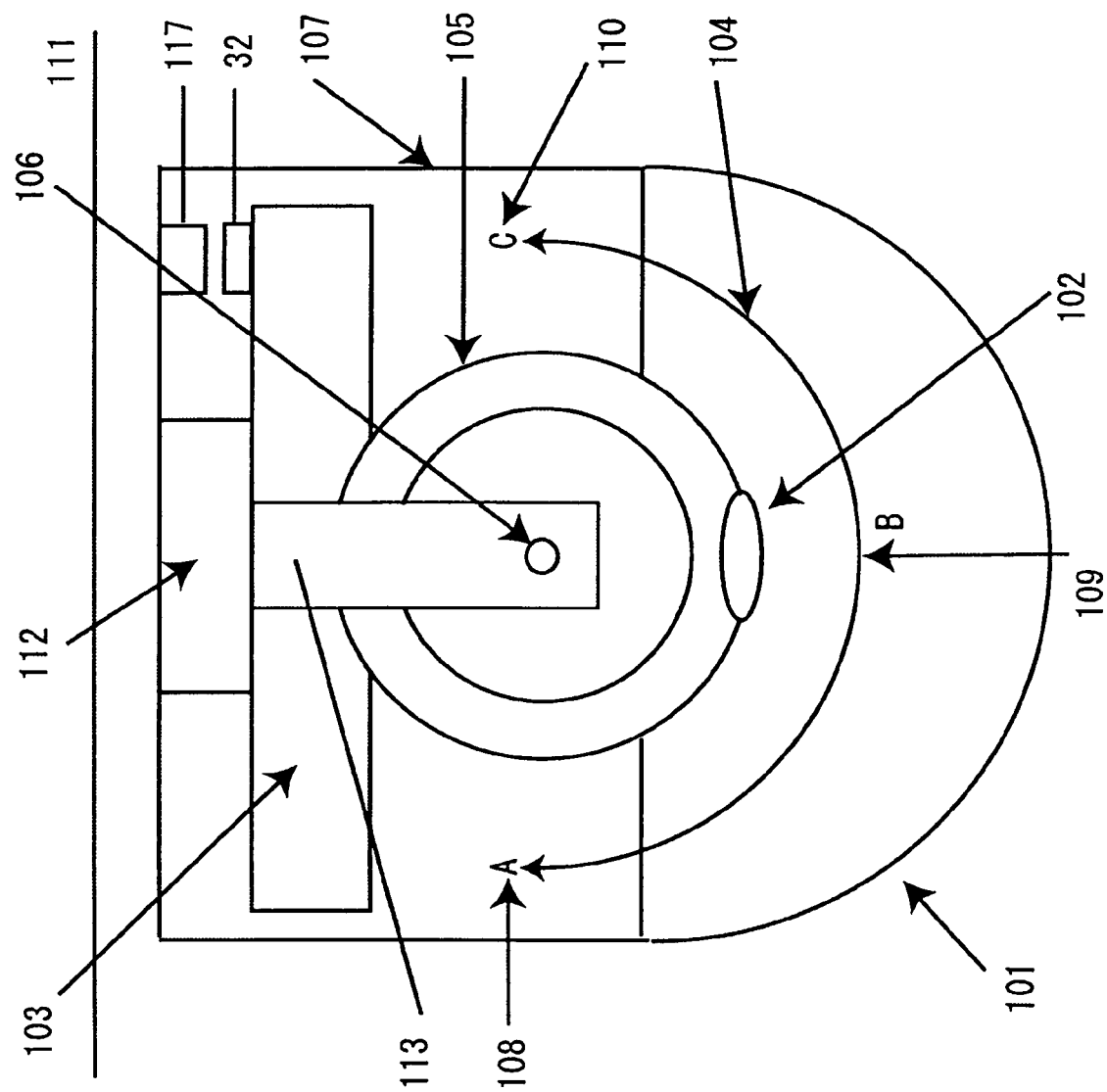
FIG. 9 is a side cross-sectional view showing a construction of the compound camera according to the invention.
Figure 10:
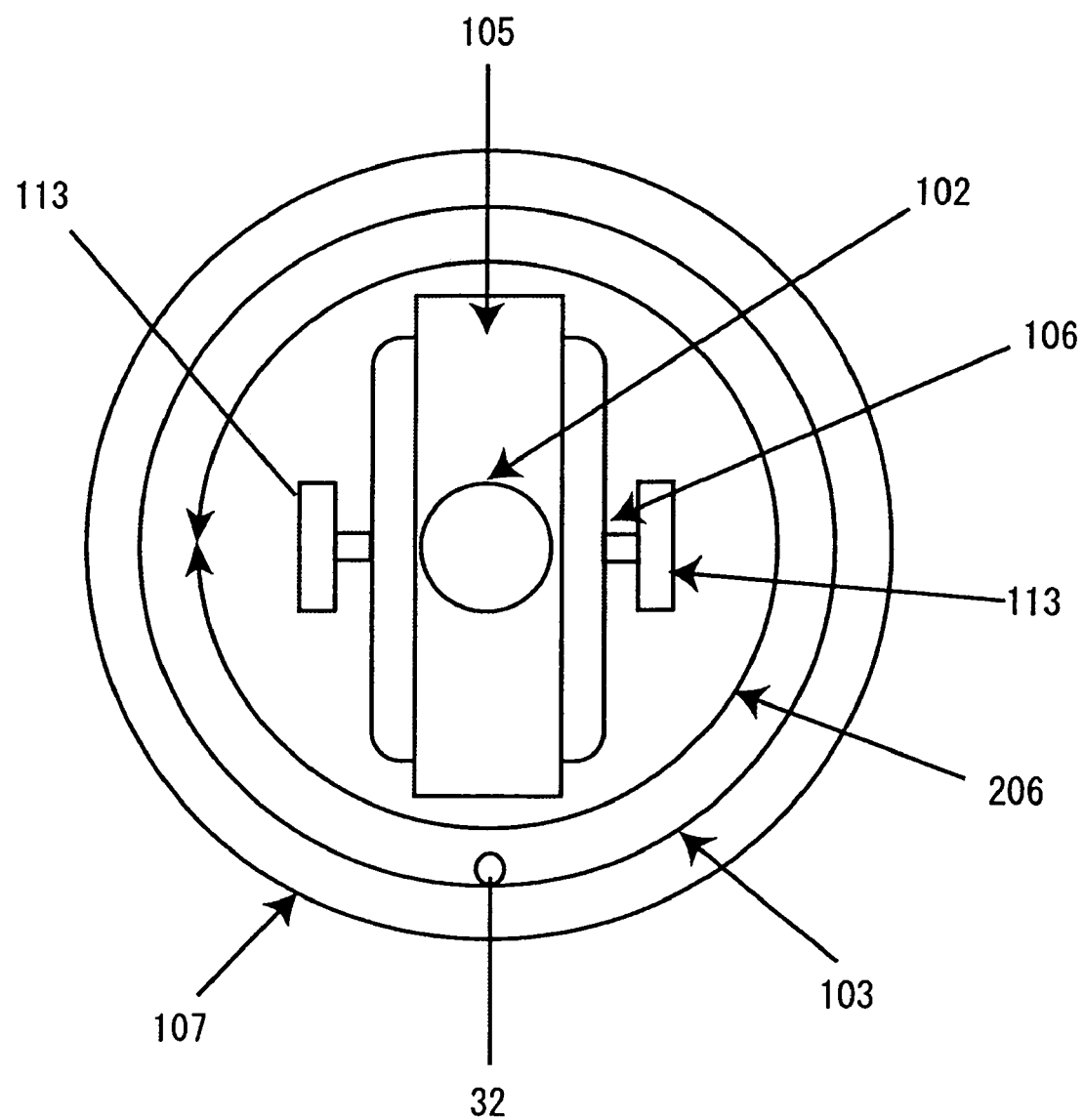
FIG. 10 is a plan cross-sectional view showing the construction of the compound camera according to the invention.

As a compound camera according to the present invention, as the side cross-sectional view of FIG. 9 and the plan view of FIG. 10 show, a housing comprising a cylindrical camera base 107 and a semi-spherical camera cover 101 accommodates a monitor camera 102, a rotatable tilt table 105 for holding the camera 102 directly, a rotatable pan table 103 capable of limitlessly rotating 360 degrees, a pair of columns 113 planted on the rotatable pan table 103, a tilt rotary shaft 106 for rotatably supporting the rotatable tilt table 105 with respect to the columns 113, and a slip ring 112 acting as a contact for supply of power into the housing or for input/output of electrical signals. Although omitted from the illustration, the compound camera is additionally equipped with a rotating mechanism for the rotatable pan table 103 and the rotatable tilt table 104, a motor functioning as a rotational drive source, a drive control section for the motor, an amplifying circuit for amplifying video signals, and a control section for controlling an operation of the compound camera system. In addition, a magnet 117 is fixed at an origin position for determining the origin of rotation in the panning direction, while a home-position (origin) Hall element 32 is placed on the rotatable pan table 103 for detecting a magnetic field from the magnet 117.

The rotatable tilt table 105, holding the camera 102, is rotatable through 180 degrees around the tilt rotary shaft 106 and, therefore, the camera 102 is reversibly rotatable from a point A (designated at numeral 108 in FIG. 9) through a lowermost point B (designated at numeral 109 in FIG. 9) to a point C (designated at numeral 110 in FIG. 9).

On the other hand, the rotatable pan table 103 is rotatable horizontally through 360 degrees as indicated by a rotation locus (designated at numeral 206 in FIG. 10).

Furthermore, the slip ring 112 realizes the supply of power from a fixed section to a moving section and the communication of electric signals between the fixed section and the moving section in the compound camera system.

Accordingly, when this compound camera is installed, for example, on a ceiling 111, the camera 102 takes a photograph on a monitoring area in all directions in a manner that the angle of rotation of the rotatable tilt table 105 is controlled remotely and the rotatable pan table 103 is rotated in a predetermined direction.

Figure 11:
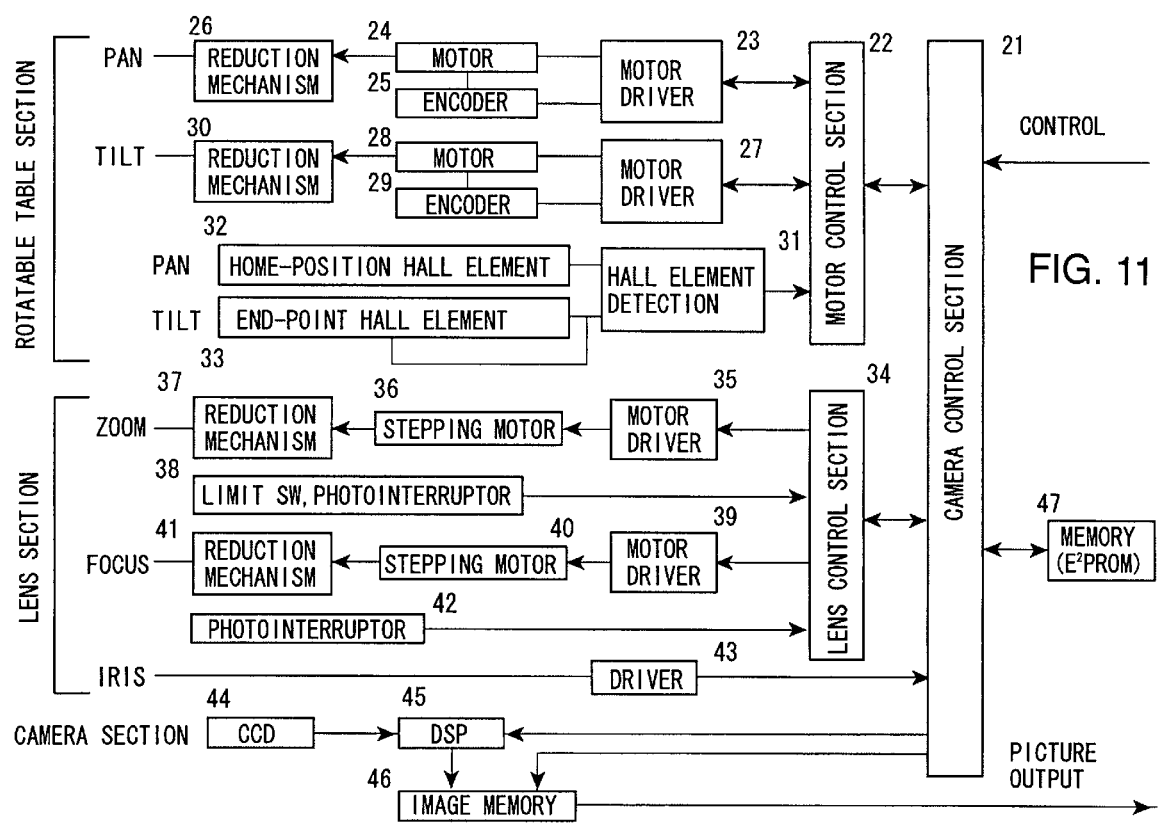
FIG. 11 is a block diagram showing a configuration of the compound camera according to the invention.
Figure 12:
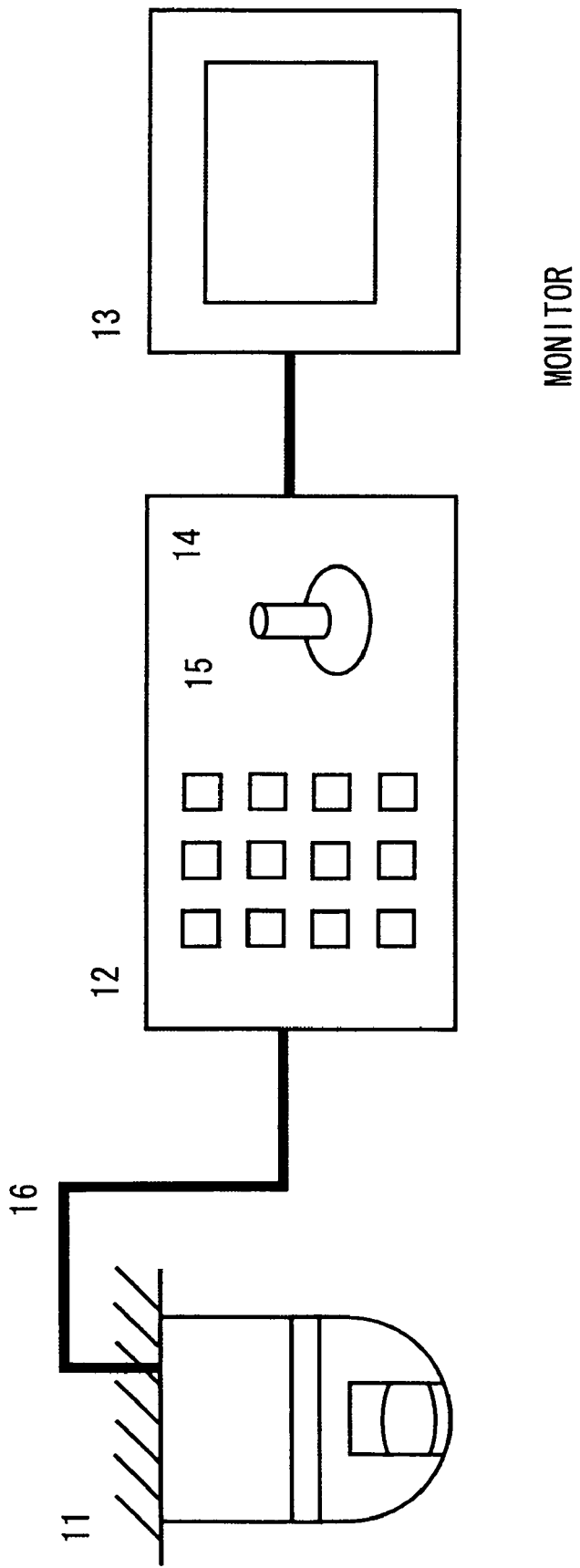
FIG. 12 is an illustration of a control system of a compound camera system in the related art.
Figure 13:
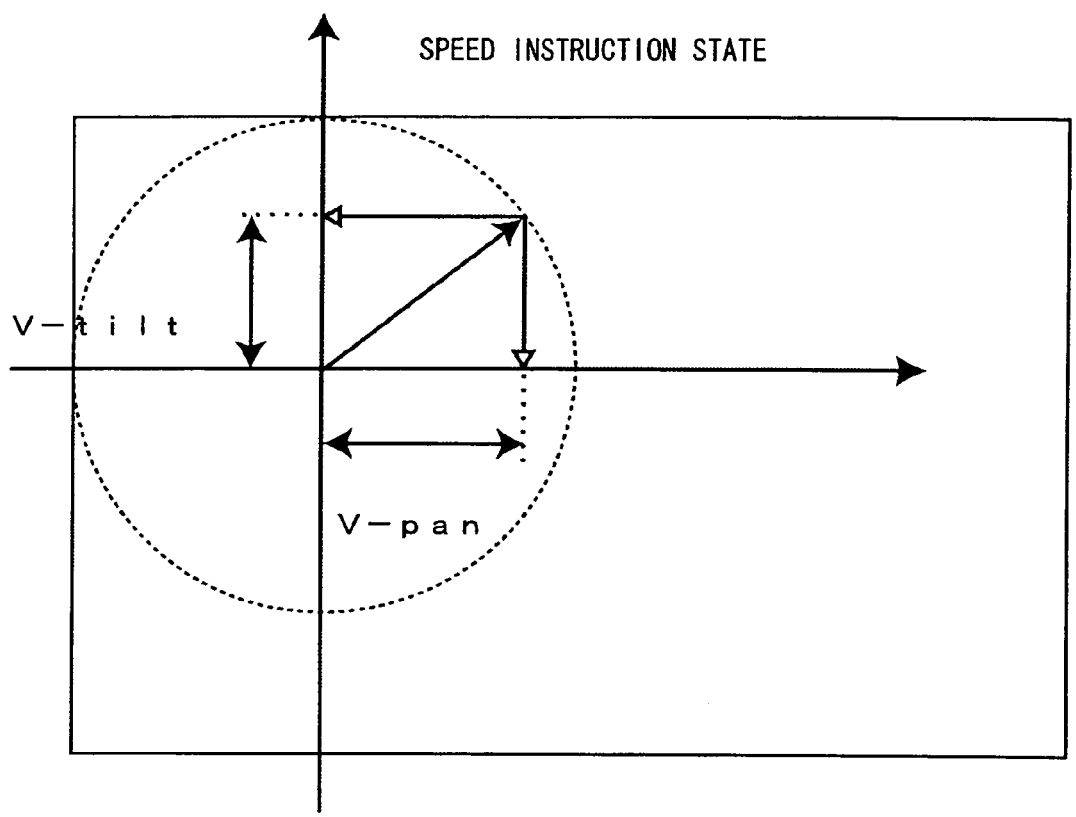
FIG. 13 is an illustration for describing camera speed control in the compound camera system in the related art.
Figure 14:
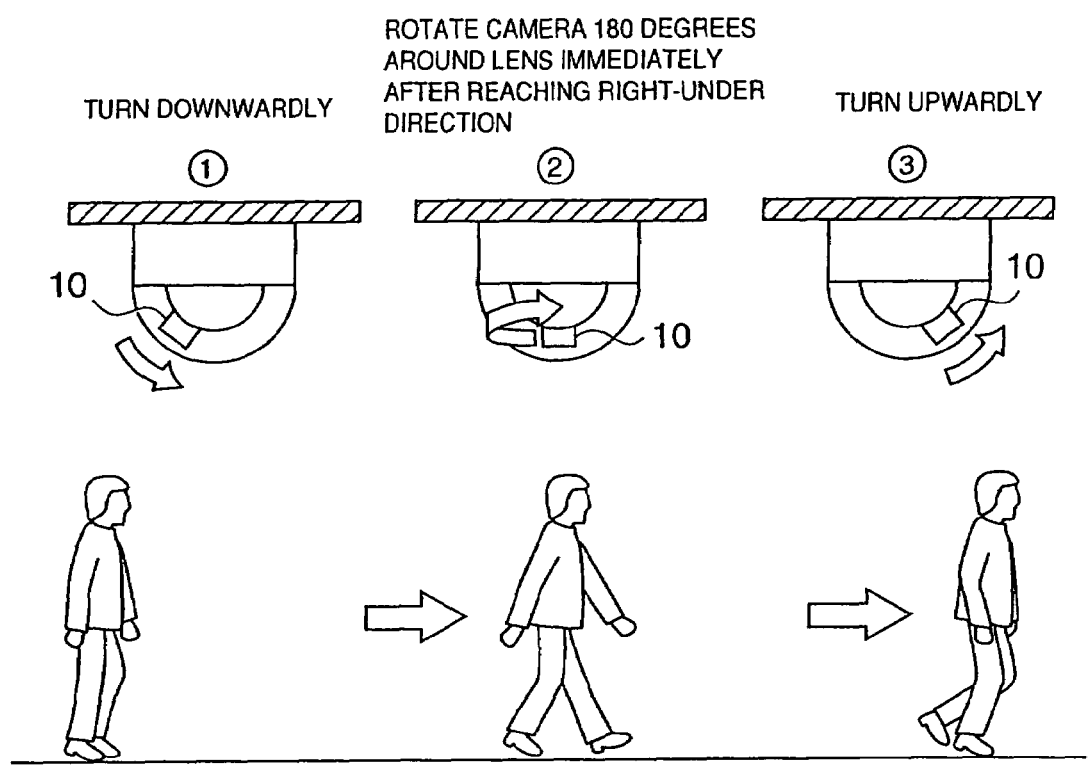
FIG. 14 is an illustration for describing an operation of a compound camera in the related art.

FIG. 11 is a functional block diagram showing an internal configuration of the compound camera. As a rotation control mechanism for the rotatable pan table 103 and the rotatable tilt table 105, there are provided motors 24, 28, encoders 25, 29 for detecting speeds of rotation (revolutions) of the motors 24, 28 motor drivers 23, 27 for driving the motors 24, 28 on the basis of the detection results of the encoders 25, 29, reduction mechanisms 26, 30 for reducing the rotation of the motors 24, 28 to transmit the reduced rotation to the rotatable pan table 103 and the rotatable tilt table 105, respectively, an origin Hall element 32 placed on the rotatable pan table 103 and sensitive to a magnetic field of the magnet 117 situated at the pan origin, end-point Hall elements 33 located 180 degrees apart on the rotatable tilt table 105 and sensitive to magnetic fields of magnets placed at tilt end-point positions, a Hall element signal detecting section 31 for detecting the pan origin and the tilt end points on the basis of detection signals from the Hall elements 32, 33, and a motor control section 22 for controlling the motor drivers 23, 27 in accordance with the detection results of the Hall element detecting section 31.

In addition, as a control mechanism for a camera lens section, there are provided stepping (stepper) motors 36, 40 for zoom and focus adjustments, motor drivers 35, 39 for outputting drive pulses to the stepping motors 36, 40, respectively, reduction mechanisms 37, 41 for reducing the rotation of the stepping motors 36, 40 to transmit the reduced rotation to lens mechanisms, respectively, a limit switch (or photointerruptor) 38 for detecting the limit of the zoom adjustment, a photointerruptor 42 for detecting the limit of the focus adjustment, a lens control section 34 for controlling the motor drivers 35, 39, and a driver 43 for adjusting the iris.

Still additionally, a camera section, outputting a video signal, is composed of an image pickup device (CCD) 44, a DSP 45 for encoding a video signal, and an image memory 46 in and from which image data is writable and readable.

Moreover, in the compound camera system, are included a camera control section 21 for controlling an operation of the compound camera system in accordance with a control signal from a controller (not shown), and a memory ($E^2$PROM) 47 for storing data.

Figure 1:
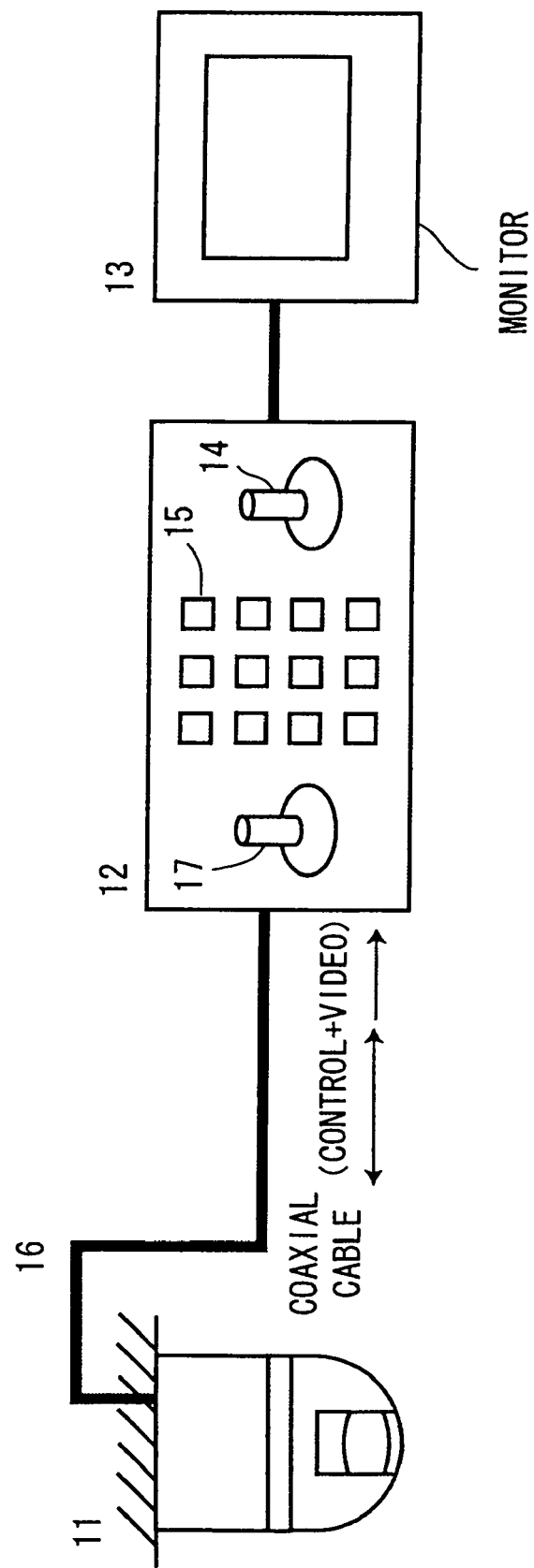
FIG. 1 is an illustration of a control system of a compound camera system according to a first embodiment of the present invention.

As FIG. 1 shows, a controller 12 for controlling a compound camera 11 and a monitor 13 for displaying a picture taken through the compound camera 11 are connected through a coaxial cable 16 to the compound camera 11. The controller 12 functions as a control element, and comprises two types of joysticks 14, 17 and a numeric pad (numeric keys) 15.

Figures 4, 5, 6:
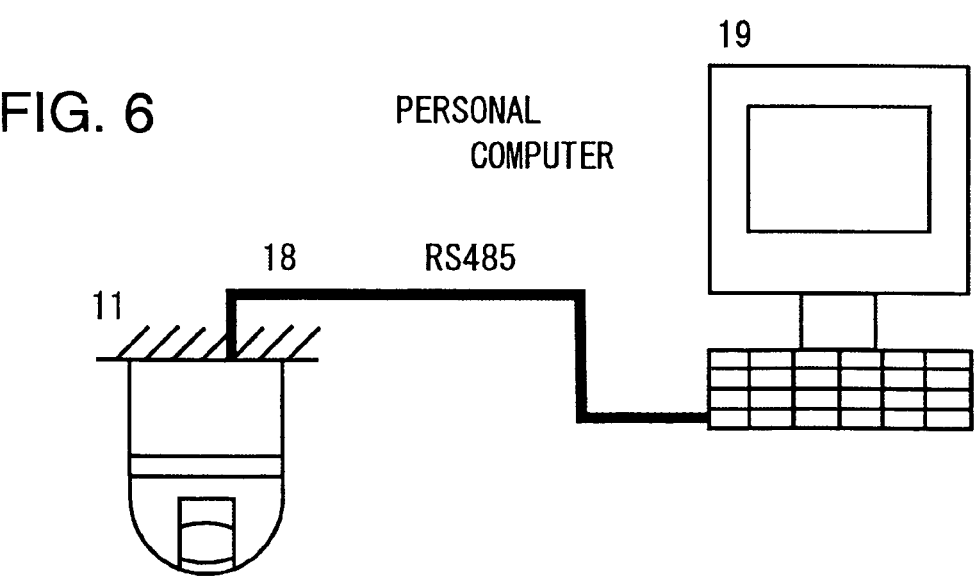
FIG. 4 is an illustration of data representative of preset state quantities to be stored in the compound camera according to the first embodiment of the invention.
FIG. 5 is an illustration of data representative of a pan rotation angle and a tilt rotation angle for each of moving paths, for calculation of the optimum path in the compound camera according to the first embodiment of the invention.
FIG. 6 an illustration of a control system of a compound camera system according to a second embodiment of the invention.

Furthermore, as FIG. 6 shows, the compound camera 11 can also be connected through RS485 serial communication 18 to a personal computer 19 so that a compound camera 11 is controlled through the personal computer 19 with a picture taken by the compound camera 11 and displayed on a screen of the personal computer 19.

In the illustration, although one compound camera 11 is connected to the controller 12 or the personal computer 19, it is also possible that a plurality of compound cameras are connected to the controller 12 or the personal computer 19 to be controlled therethrough. The compound camera control to be executed through the use of the personal computer 19 will be described in detail in a second embodiment of the invention.

In this compound camera 11, the output pulses of the encoder 25 for detecting the rotation of the motor 24 in a panning direction is sent to the motor control section 22, and a point of time at which the home-position element 32 has detected the pan origin is communicated through the Hall element signal detecting section 31 to the motor control section 22. When the number of pulses to be outputted from the encoder 25 while the rotatable pan table 103 makes one revolution (during one revolution of rotatable pan table 103) is taken as p, the motor control section 22 counts the number m of output pulses of the encoder 25 from when the Hall element 32 has detected the pan origin to calculate the present pan angle Pt according to the following equation. The present pan angle Pt calculated thus is preserved in the memory 47.

$$Pt = m \times 360/p$$

Likewise, the output pulses of the encoder 29 which detects the rotation of the motor 28 in a tilt direction are forwarded to the motor control section 22, and the point of time at which the tilt end point has been detected by the end-point Hall element 33 is communicated through the Hall element signal detecting section 31 to the motor control section 22. When the number of pulses to be outputted from the encoder 29 while the rotatable tilt table 105 makes half a revolution (during half revolution of rotatable tilt table 105) is taken as q, the motor control section 22 counts the number n of output pulses of the encoder 29 from when the end-point Hall element 33 has detected a tilt end point, and calculates the present tilt angle Tt according to the following equation.

$$Tt=90-(n\times180/q)$$

That is, the tilt angle is taken as 0 when the camera 102 face downwardly (right under) and the tilt angle is calculated with respect to the right-downward direction. The possible tilt angle ranges from +90 degrees to −90 degrees. The present tilt angle Tt calculated is retained in the memory 47.

Furthermore, the field angle of a picture to be photographed by the lens section depends upon the rotating quantity of the stepping motor 36 determining the zooming quantity, while the rotating quantity thereof depends upon the number of pulses to be outputted to the stepping motor 36. Likewise, the focal length depends upon the number of pulses to be outputted to the stepping motor 40. When counting a pulse for rotating each of the stepping motors 36 and 46, the lens control section 34 counts it as "plus" when each of the stepping motors 36 and 46 is rotated forwardly, while counting it as "minus" when each of the stepping motors 36 and 46 is rotated reversely, thus cumulatively calculating the number of pulses outputted from each of the motor drivers 35 and 39. These numbers of pulses cumulatively calculated are retained in the memory 47 as data representative of the present field angle Zt and the focal length Ft.

In this way, the values Pt, Tt, Zt and Ft are preserved in the memory 47 as data representative of the present quantity of state of the compound camera 11.

As the data representative of the present state quantities of the compound camera 11, it is also possible to additionally preserve, for example, data indicative of the present color balance or image level or cyclic stop time data indicative of the elapse time from the stop of rotating movement for monitoring the same place.

In controlling an operation of this compound camera 11, a command is transmitted from the controller 12 shown in FIG. 1 or the personal computer 19 shown in FIG. 6. In the compound camera 11, the camera control section 21 interprets the received command to control an operation of each of parts.

For example, for the setting of a preset point, an operator remotely controls the camera direction through the use of the controller 12 or the personal computer 19 to set the camera position of the compound camera 11 at a target preset point. This camera direction controlling method will be described in detail later.

When confirming the fact that the compound camera 11 is aligned with the target direction, the operator remotely controls the zoom quantity when needed, and then inputs a preset instruction and the ID of that preset point through the controller 12 or the personal computer 19. A preset instruction command including this ID is forwarded to the compound camera 11, and the camera control section 21 interprets the command and cumulatively puts the data Pt, Tt, Zt and Ft representative of the present state quantities of the compound camera 11, together with the ID, in the memory 47.

Through repetition of this operation, a plurality of preset points are set in the memory 47 as shown in FIG. 4.

Furthermore, when the operator designates the ID (for example ID=2) of a preset point through the use of the controller 12 or the personal computer 19 to give an instruction for photographing the preset point, the camera control section 21 of the compound camera 11 interprets the received command and reads out the preset point state quantities P2, T2, Z2 and F2 for ID=2 and the present state quantities Pt, Tt, Zt and Ft from the memory 47 to obtain the shortest path (route) from the present camera position to the preset point of ID=2.

Possible moving paths from the present camera position to the preset point of ID=2 are:
1. a path through which the preset point is reached due to right-turning pan rotation and tilt rotation within the same region (that is, when the present tilt angle is in the positive region, the tilt rotation takes place in the positive region, while, if the present tilt angle is in the negative region, it takes place in the negative region);
2. a path to the preset point due to left-turning pan rotation and tilt rotation in the same region;
3. a path to the preset point due to tilt rotation for shifting into a different region (tilt rotation causing passing through the tilt angle of zero degree and shifting from the positive region to the negative region or from the negative region to the positive region) and right-turning pan rotation; and
4. a path to the preset point due to tilt rotation into a different region and left-turning pan rotation.

For each of the moving paths, the pan rotation angle and the tilt rotation angle are as shown in FIG. 5. In the compound camera 11, the camera control section 21 takes note of the larger one of the pan rotation angle and the tilt rotation angle for each of the moving paths, and selects, as the shortest path, the moving path taking the smallest rotation angle. This is because, in a case in which the rotation in a panning direction and the rotation in a tilting direction are made concurrently for the shifting to the target preset point, the time taken for the arrival at the preset point depends upon the larger one of the pan rotation angle and the tilt rotation angle.

On the selection of the shortest path, the camera control section 21 give an instruction to the motor control section 22 so that the pan rotation and tilt rotation take place according to the pan and tilt rotation angles for the selected moving path, and further gives an instruction to the lens control section 34 for the output of a pulse (Z2–Zt) to the zoom stepping motor 36 and for the output of a pulse (F2–Ft) to the stepping motor 40.

The motor driver 23 makes the motor 24 rotate by the pan rotation angle designated through the motor control section 22, and when detecting, on the basis of the output of the encoder 25, the fact that the motor 24 has rotated by the designated angle, ceases the rotation of the motor 24. Likewise, the motor driver 27 makes the motor 28 rotate by the tilt rotation angle designated through the motor control section 22, and when detecting, on the basis of the output of the encoder 29, the fact that the motor 28 has rotated by the designated angle, ceases the rotation of the motor 28. In consequence, the camera faces the position of the preset point ID=2 so that the photographing starts in the lens condition at the presetting. Incidentally, the adjustment of iris is accomplished by starting the driver 43 in accordance with the brightness of the subject at that time.

The CCD 44 takes a picture in the camera facing direction, and the resultant video signal is encoded by the DSP 45 and then written in the image memory 46. Thereafter, the video signal is read out from the image memory 46 to be outputted to the monitor 13.

At this time, in the selected shortest path, when the tilt rotation passes through zero degree and enters a different region (that is, in the case of the selection of the third or fourth moving path), the readout of the image data from the image memory 46 is conducted in the reverse order. This can prevent the reversal of the image to be displayed on the monitor 13.

Furthermore, it is also appropriate that two points other than a tilt angle of zero are set as the points (camera directions) at which the image data readout direction is switched actually so that the image data readout direction is switched in a case in which the tile angle passes through one of these two points and advances to the minus side while the switching of the image data readout direction is canceled in a case in which the tilt angle passes through the other point and advances to the plus side. Thus, when the switching of the image data readout direction shows a hysteresis, frequent occurrence of image reversal in the vicinity of the switching points is preventable.

Secondly, a description will be given hereinbelow of a method of controlling the camera direction through the use of the controller 12 shown in FIG. 1.

The joystick 14 of the controller 12 is for controlling the camera speed as in the case of a conventional system. On the other hand, the joystick 17 is designed to control the camera moving direction by being inclined.

Figure 3A:
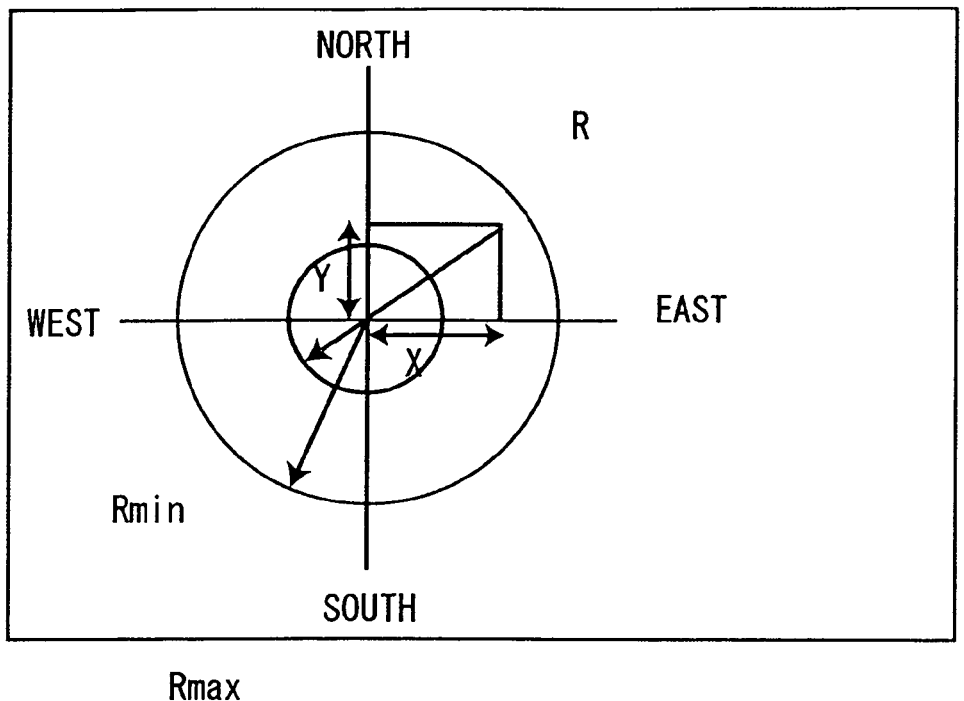
FIGS. 3A and 3B are illustrations useful for explaining a compound camera position controlling method in the first embodiment of the invention.
Figure 3B:
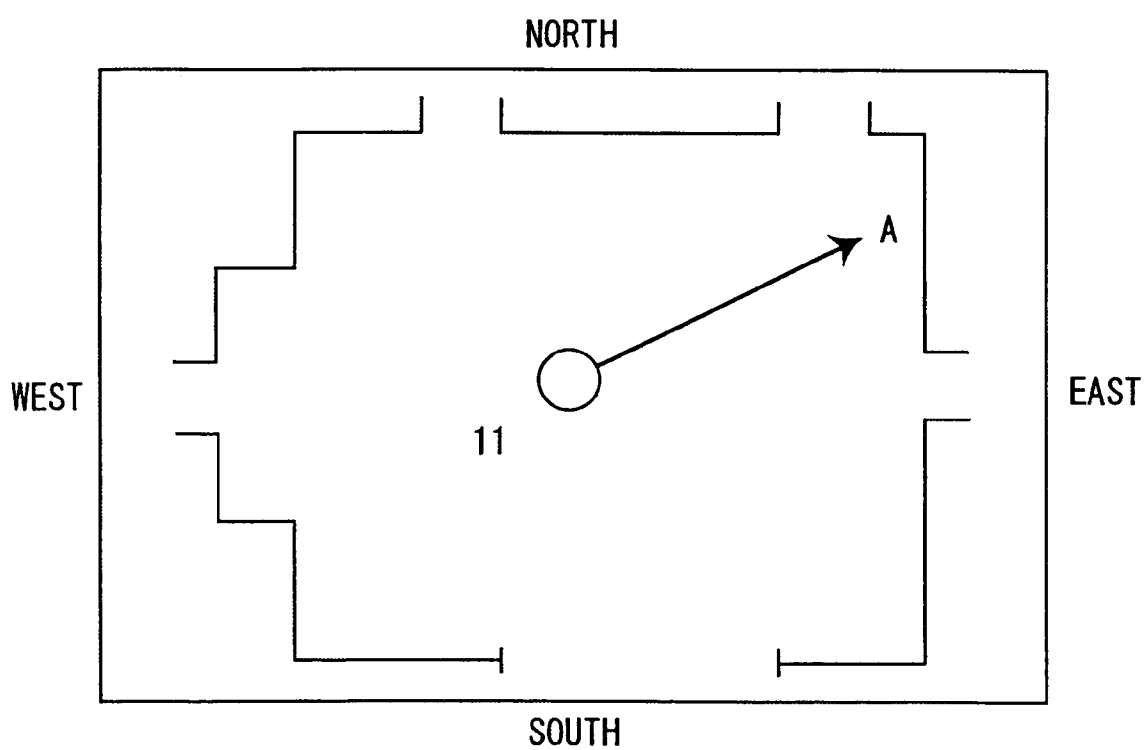

When an operator turns the camera toward the direction indicated at character A in FIG. 3B, the operator tilts the joystick 17 of the controller 12 in that direction (R) as shown in FIG. 3A. In accordance with this manipulation by the operator, the controller 12 transmits, to the compound camera 11, a command representative of camera position control, and data indicative of an X-axis component of the tilting of the joystick 17 and data indicative of a Y-axis component thereof.

Figure 2:
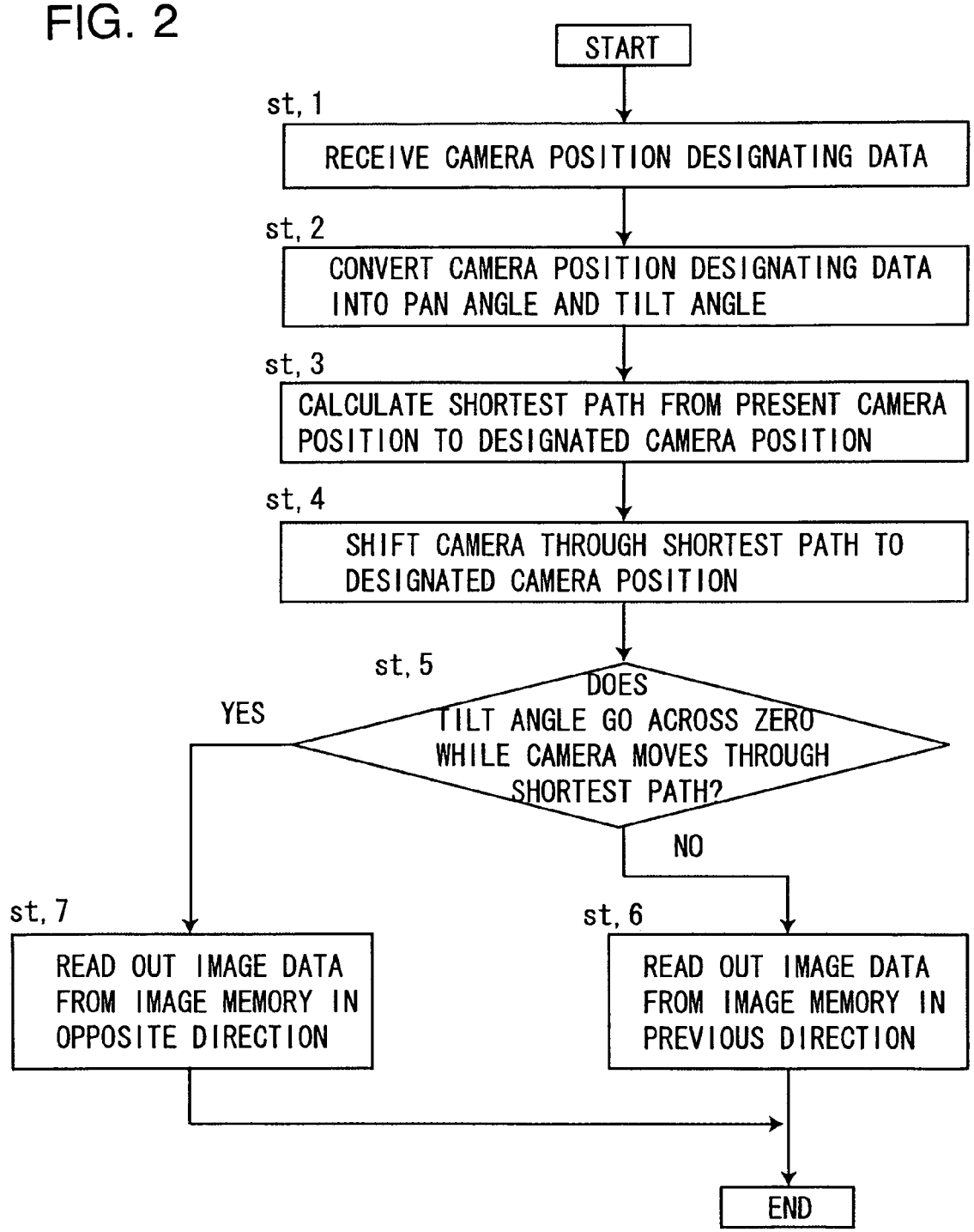
FIG. 2 is a flow chart showing an operational procedure in a compound camera according to the first embodiment of the invention.

FIG. 2 is a flow chart showing an operation of the compound camera 11 at the reception of this command.

In a step 1, the camera control section 21 of the compound camera 11 receives data (Xk, Yk) designating a camera position. In a step 2, the camera control section 21 converts this data (Xk, Yk) into a pan angle Pk and a tilt angle Tk. This conversion is made according to the following equations (2) and (3) on the condition of the following equation (1).

$$Rk > Rmin \quad (1)$$

$$Pk + a0 = arctan(Yk/Xk) \quad (2)$$

$$Tk = arcsin(Rk/Rmax) \quad (3)$$

where Rx represents the length $(=(Xk^2+Yk^2)^{1/2})$ of the vector R whose components are Xk and Yk, Rmin denotes the length of the vector R still needed for the conversion, Rmax depicts the length of the vector R when the inclination (tilting) of the joystick 17 is at a maximum, and a0 designates an angle indicative of a difference between the X-axis direction (east-to-west direction) and a direction of the pan origin.

Following this, in step 3, the camera control section 21 reads out the present camera state quantities (Pt. Tt, Zt and Ft) from the memory 47 and, according to the above-mentioned manner, calculates the shortest path from the present camera position (pan angle Pt, tilt angle Tt) to the designated camera position (pan angle Pk, tilt angle Tk).

Furthermore, in a step 4, the camera control section 21 gives an instruction (designation) to the motor control section 22 so that the camera is shifted through the shortest path to the designated camera position. In addition, the camera control section 21 gives an instruction to the lens control section 34 so that pulses (Z0–Zt) are outputted therefrom to the stepping motor 36 to return the lens field angle to the normal (standard) field angle (where Z0 designates the number of pulses to be outputted to the stepping motor 36 for accomplishing the normal field angle).

After this, in a step 5, the camera control section 21 checks whether or not the tilt angle is converted into a different sign (passes through zero) at the movement along the shortest path. If the answer of the step 5 indicates no conversion of the tilt angle into the different sign, a step 6 follows to read out the image data, picked up by the CCD 44 and stored in the image memory 46, in order from the same direction as before, then sending them to the monitor 13.

On the other hand, if the answer of the step 5 indicates the conversion of the tilt angle into the different sign, a step 7 follows to read out the image data, stored in the image memory 46, in order from the opposite direction thereto, then sending them to the monitor 13.

With this operation of the compound camera 11, the operator can align the camera with a target direction by inclining the joystick 17 in the target direction even if the operator does not know the present camera direction.

According to the equations (2) and (3) in the step 2, the movement of the joystick 17 is translated into a pan angle and a tilt angle so that the manipulation range of the joystick 17 corresponds to the maximum pan and tilt operation regions. This enables a large change of the camera direction with slight movement of the joystick 17, whereas the camera position designation becomes rough, thereby making it difficult to alter the camera direction finely.

However, this is improvable by switching the variations of Pk and Tk with the movement of the joystick 17 to minute fixed values after the conversion into the pan and tilt angles according to the foregoing equations (1), (2) and (3).

In this case, the operator roughly aligns the camera direction with a target by manipulating the joystick 17 and then controls the joystick around there to adjust the camera direction little by little, thereby making the camera direction coincide with the target direction.

Furthermore, although FIG. 1 shows an example in which the joystick 14 for the speed control of the compound camera 11 and the joystick 17 for the position control thereof are separately placed in the controller 12, it is also possible to use one joystick for both the speed control and position control. In this case, a switch for conducting the switching between modes is provided to select one of the speed control mode and the position control mode. In the case of the selection of the speed control mode, in response to manipulation of the joystick, a command representative of the speed control and speed control data are transmitted to the compound camera 11, and the camera control section 21 thereof interprets the command and changes the moving speed of the rotatable camera table. On the other hand, in the case of the selection of the position control mode by the mode switch, at the manipulation of the joystick, a command representative of the position control and position control data are sent to the compound camera 11, and the camera control section 21 thereof interprets the command and adjusts the angle of the rotatable camera table or the like.

In addition, in the case of the position control by the joystick, if the map shown in FIG. 3B is adhered around the joystick, the instruction (manipulation) on the camera direction by the joystick becomes facilitated.

Still additionally, in the case of the position control by the joystick, if an arrangement is made such that, not until another switch is pressed or the joystick is maintained in the same condition for several seconds, the position control data based on the manipulation of the joystick is transmitted, useless movement of the compound camera 11 is avoidable.

Moreover, in the above description, although the zoom condition (field angle) is switched to a normal field angle (step 4) at the control of the camera position, it is also acceptable that the zoom condition is maintained without being switched.

Still moreover, it is also possible to use a coordinate inputting means such as a track ball, a tablet or a pointing device, in place of the joystick.

Second Embodiment

A description will be given hereinbelow of a second embodiment of the present invention. The second embodiment relates to position control of the compound camera 11 through the use of the personal computer 19.

In the case of the employment of the personal computer 19, owing to an information processing function thereof, more complicated control becomes feasible.

Figure 7:
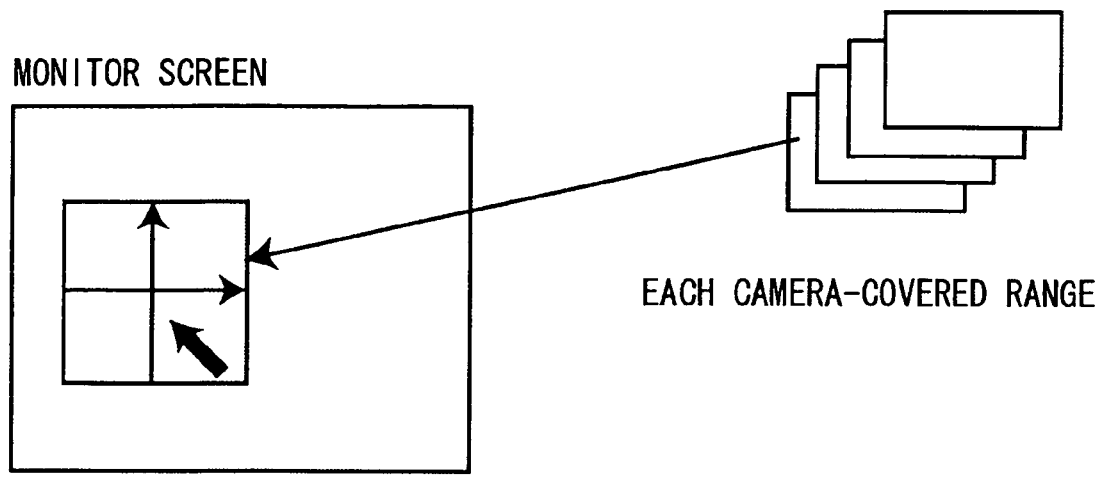
FIG. 7 is an illustration useful for explaining a compound camera position controlling method in the second embodiment of the invention.

For example, the personal computer 19 reads map information on each compound camera monitoring area recorded in a recording medium and as shown in FIG. 7, displays the map information on that compound camera monitoring area on a portion of a screen of the personal computer 19 for displaying a picture taken by the compound camera 11, with a position on this map being designated or pointed out by a cursor to align the camera with that position.

In this case, a command representative of camera position control and coordinate information (Xk, Yk) on the map designated by the cursor are transmitted from the personal computer 19 through a transmission line to the compound camera 11. The operation of the compound camera 11 to be conducted when receiving these signals is the same as that in the above-described first embodiment.

In this way, it is possible to implement the position control of a plurality of compound cameras through the use of one personal computer. Additionally, it is also possible to use, as the map information, CAD data such as a building design drawing.

Figure 8:
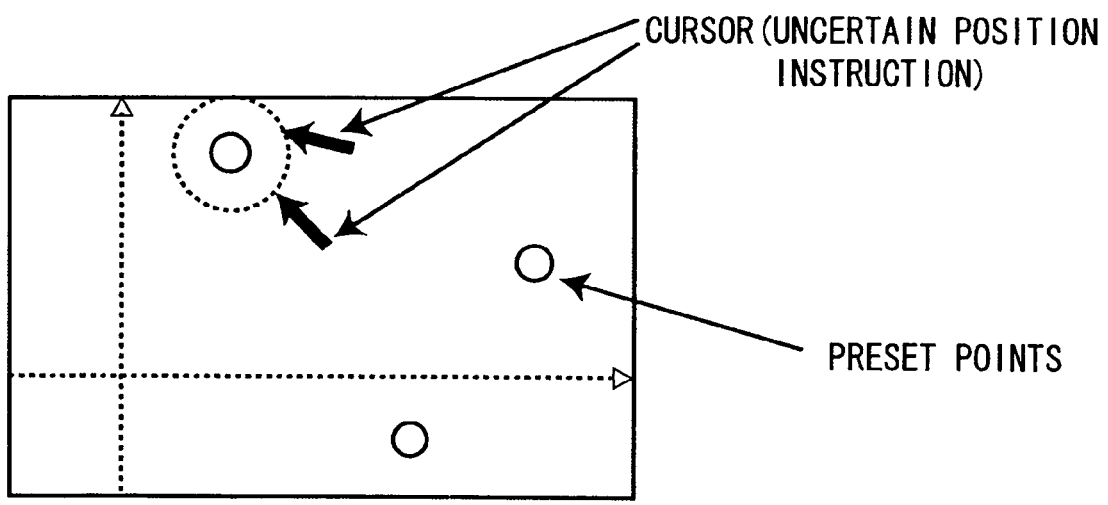
FIG. 8 is an illustration useful for describing another compound camera position controlling method in the second embodiment of the invention.

Furthermore, it is also possible that the personal computer 19 obtains the data on the stored preset point state quantities (Pk, Tk) from the compound camera 11 and calculates the coordinate values (Yk, Xk) according to the aforesaid equations (2) and (3) to record the preset point position on the map on the basis of the coordinate values. Still furthermore, it is also possible that, as FIG. 8 shows, map information indicative of the positions of a group of preset points is displayed on a screen so that a preset point is designated by the cursor to align the camera with the position thereof. At this time, the personal computer 19 transmits ID data, linked with that preset point, to the compound camera 11.

In addition, in this case, as FIG. 8 shows, even if the cursor position is out of a preset point, when the departure distance therefrom is below a predetermined value, a judgment is made that the preset point is designated, and the personal computer 19 transmits the ID of that preset point. On the other hand, if the cursor position is separated by the predetermined value from the preset point, the coordinate information on the cursor position is fed to the compound camera 11 to turn the camera to that coordinate position.

Still additionally, it is also possible that a picture taken by the compound camera 11 is displayed on the screen of the personal computer 19 and a position of that picture is designated by the cursor to be displayed in an enlarged condition.

In this case, the personal computer 19 obtains the data on the recorded present camera state quantities (Pt, Tt, Zt, Ft) from the compound camera 11 to calculate a pan angle (Pw), a tilt angle (Tw), a zooming state (Zw) and a focusing state (Fw) for enlargement display of the position pointed out by the cursor, and sends them to the compound camera 11. The compound camera 11 adjusts the state quantities of the lens system and the rotatable tables on the basis of the received data.

In this way, it is possible to designate a finer position and to display a clearer picture of that position.

Although the above description relates to the display of a picture taken by the compound camera on the screen of the personal computer 19, it is also appropriate that a special monitor is additionally provided to display a picture taken by the compound camera 11.

Furthermore, although the designation of a position on the screen has been made through the use of the cursor, it is also possible to use a light pen, or to place a touch panel on the screen for designating the position by fingers.

Still furthermore, it is also appropriate that the data such as preset points stored in the compound camera 11 is once sent to the personal computer and stored therein, and then transferred again to the compound camera 11 at the startup of the compound camera 11.

Moreover, although the above-described embodiments have used a compound camera capable of rotating 360 degrees in pan directions and 180 degrees in tilt directions, the present invention is also applicable to a monitor camera having at least one revolution axis.

As described above, with the monitor camera system and monitor camera controlling method according to the present invention, it is possible to align the compound camera with a target direction without requiring the understanding of the present camera direction.

In this system, since the state quantities of the camera or the rotatable tables for realizing the designated camera position are calculated and controlled on the camera side, unlike a system in which those state quantities are transmitted from the control side, it is possible to promptly act on an instruction about a camera position without suffering greatly from influence of the transmission delay or the like.

In addition, in the case of a conventional monitor camera system in which the camera moving speed is controlled remotely, when camera control is implemented through a network, since there is no guarantee of maintaining a constant transmission rate of information on the network, the reception timing of speed instruction information varies according to the network transmission rate; in consequence, the control state of the monitor camera system can vary due to the effects of the network transmission rate. On the other hand, in the case of the monitor camera system according to the present invention in which position designation information is transmitted, even if a transmission delay occurs on a network, the monitor camera system can finally implement the control according to an instruction on the basis of the received position designation information, thus realizing accurate control of the monitor camera system without receiving the influence of a transmission delay.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A monitor camera system comprising:
   a monitor camera having a rotating mechanism with at least one revolution axis; and
   control means for controlling said monitor camera, said control means sending control data for designation of one of a photographing position and photographing direction of said monitor camera to said monitor camera, said monitor camera receiving said control data and calculating one of a pan rotation quantity and a tilt rotation quantity, by which said monitor camera is to be rotated from the present camera position, on the basis of the received control data so that one of pan rotation and tilt rotation of said monitor camera is made according to the calculated quantity, wherein said control means includes a screen for displaying a monitoring area of said monitor camera, and data indicative of one of a position and a direction in said monitoring area, pointed out on said screen is fed as said control data to said monitor camera, a preset point is additionally displayed in said monitoring area on said screen, and when a distance between said position pointed out on said screen and a position of said preset point is below a predetermined value, data on designation of said preset point is fed as said control data to said monitor camera.

* * * * *